US008802342B2

(12) United States Patent
Shirai et al.

(10) Patent No.: US 8,802,342 B2
(45) Date of Patent: Aug. 12, 2014

(54) CRYSTALLINE RESINS FOR TONERS

(75) Inventors: Eiji Shirai, Wakayama (JP); Tetsuya Ueno, Wakayama (JP)

(73) Assignee: Kao Corporation, Tokyo (JP)

( * ) Notice: Subject to any disclaimer, the term of this patent is extended or adjusted under 35 U.S.C. 154(b) by 77 days.

(21) Appl. No.: 13/133,528

(22) PCT Filed: Dec. 9, 2009

(86) PCT No.: PCT/JP2009/070928
§ 371 (c)(1),
(2), (4) Date: Aug. 18, 2011

(87) PCT Pub. No.: WO2010/067884
PCT Pub. Date: Jun. 17, 2010

(65) Prior Publication Data
US 2011/0294061 A1   Dec. 1, 2011

(30) Foreign Application Priority Data

Dec. 10, 2008   (JP) ................. 2008-314961

(51) Int. Cl.
G03G 9/00 (2006.01)
G03G 9/087 (2006.01)
C08L 67/00 (2006.01)
C08L 25/00 (2006.01)
C08G 63/20 (2006.01)

(52) U.S. Cl.
CPC ........ *G03G 9/08795* (2013.01); *G03G 9/08786* (2013.01); *C08L 67/00* (2013.01); *G03G 9/08755* (2013.01); *G08G 63/00* (2013.01); *C08L 25/00* (2013.01); *G03G 9/08797* (2013.01); *G03G 9/08708* (2013.01); *G03G 9/08788* (2013.01); *C08G 63/20* (2013.01)
USPC ................ 430/109.3; 430/109.4; 430/111.41; 430/137.15

(58) Field of Classification Search
USPC ........ 430/108.1–111.4, 109.3, 109.4, 111.41, 430/137.15
See application file for complete search history.

(56) References Cited

U.S. PATENT DOCUMENTS

| | | | |
|---|---|---|---|
| 6,288,166 B1* | 9/2001 | Sata et al. ................. 525/69 |
| 7,351,510 B2 | 4/2008 | Shirai et al. |
| 7,387,863 B2 | 6/2008 | Shirai et al. |
| 7,390,605 B2 | 6/2008 | Shirai |
| 7,820,354 B2 | 10/2010 | Shirai |
| 2005/0271965 A1* | 12/2005 | Kamiyoshi et al. ........ 430/111.4 |
| 2006/0051692 A1 | 3/2006 | Hasegawa et al. |
| 2006/0105258 A1* | 5/2006 | Ishiyama et al. .......... 430/108.4 |
| 2008/0102393 A1* | 5/2008 | Hasegawa ................. 430/109.3 |
| 2008/0280219 A1* | 11/2008 | Nakayama et al. .......... 430/48 |
| 2010/0055595 A1 | 3/2010 | Shirai et al. |
| 2011/0045402 A1 | 2/2011 | Eida et al. |
| 2011/0294062 A1 | 12/2011 | Eida et al. |

FOREIGN PATENT DOCUMENTS

| | | |
|---|---|---|
| CN | 1255650 A | 6/2000 |
| CN | 1673876 A | 9/2005 |
| CN | 1778827 A | 5/2006 |
| CN | 101154060 A | 4/2008 |
| CN | 101154061 A | 4/2008 |
| EP | 0 643 336 | 3/1995 |
| EP | 1 624 345 | 2/2006 |
| JP | 4-81770 | 3/1992 |
| JP | 7-120976 | 5/1995 |
| JP | 2005-300867 | 10/2005 |
| JP | 2005-321747 | 11/2005 |
| JP | 2006-337943 | 12/2006 |
| JP | 2007-148399 | 6/2007 |

OTHER PUBLICATIONS

International Search Report issued Jun. 29, 2010 in PCT/JP09/070928 filed Dec. 9, 2009.
Combined Chinese Office Action and Search Report issued Nov. 22, 2012 in Chinese Patent Application No. 200980149878.9 (with English-language translation and English Translation of Category of Cited Documents).
Japanese Office Action issued Jun. 25, 2013, in Japan Patent Application No. 2008-314961.
T. G. Fox, "Influence of Diluent and Copolymer Composition on the Glass Temperature of a Polymer System", Bulletin of the American Physical Society, Series II, vol. 1, No. 1, Jan. 30, 1956, p. 123.

\* cited by examiner

*Primary Examiner* — Mark F Huff
*Assistant Examiner* — Rashid Alam
(74) *Attorney, Agent, or Firm* — Oblon, Spivak, McClelland, Maier & Neustadt, L.L.P.

(57) ABSTRACT

The present invention relates to a crystalline resin for toners which includes a composite resin including a polycondensation-based resin component obtained by polycondensing an alcohol component containing an aliphatic diol having 2 to 10 carbon atoms with a carboxylic acid component containing an aromatic dicarboxylic acid, and a styrene-based resin component; a resin binder containing the crystalline resin and a non-crystalline resin; and a toner for electrophotography which contains the resin binder. According to the present invention, there are provided a crystalline resin for toners which is capable of producing a toner that is excellent in not only low-temperature fixing ability but also gloss of images and anti-filming property, a resin binder, and a toner for electrophotography.

13 Claims, No Drawings

CRYSTALLINE RESINS FOR TONERS

FIELD OF THE INVENTION

The present invention relates to a crystalline resin for toners which is employed in electrophotography, an electrostatic recording method, an electrostatic printing method or the like, a resin binder containing the crystalline resin and a non-crystalline resin, and a toner for electrophotography which contains the resin binder.

BACKGROUND OF THE INVENTION

In recent years, there is a demand for development of toners having excellent low-temperature fixing ability from the viewpoint of achieving higher image qualities. For example, JP 4-81770A discloses a toner for development of electrostatic images which contains, as a resin binder, a block copolymer or a graft copolymer obtained by chemically bonding 3 to 50 parts by weight of a crystalline polyester and 97 to 50 parts by weight of an ionically-crosslinked amorphous vinyl polymer to each other for the purpose of providing a toner for development of electrostatic images which exhibits an excellent low-temperature fixing ability without deterioration of an anti-offset property.

JP 2005-300867A discloses a resin binder for toners which contains a crystalline polyester and a non-crystalline polyester for the purpose of providing a resin binder for toners which is excellent in low-temperature fixing ability, environmental stability and anti-blocking property as well as a toner containing the resin binder, wherein the crystalline polyester is a resin having a softening point of from 80 to 130° C. which is obtained by polycondensing an alcohol component containing 70 mol % or more of an aliphatic diol having 2 to 8 carbon atoms with a carboxylic acid component containing 70 mol % or more of an aromatic dicarboxylic acid compound, and the non-crystalline polyester-based resin is a resin containing a polyester component obtained by polycondensing an alcohol component containing 70 mol % or more of an alkyleneoxide adduct of bisphenol A with a carboxylic acid component.

SUMMARY OF THE INVENTION

The present invention relates to the following aspects.

(1) A crystalline resin for toners, which includes a composite resin including a polycondensation-based resin component obtained by polycondensing an alcohol component containing an aliphatic diol having 2 to 10 carbon atoms with a carboxylic acid component containing an aromatic dicarboxylic acid, and a styrene-based resin component;

(2) A process for producing a crystalline resin for toners, which includes the step of polymerizing (a) raw monomers of a polycondensation-based resin component which contain an alcohol component containing an aliphatic diol having 2 to 10 carbon atoms and a carboxylic acid component containing an aromatic dicarboxylic acid, (b) raw monomers of a styrene-based resin component and (c) a bireactive monomer capable of reacting with both the raw monomers of the polycondensation-based resin component and the raw monomers of the styrene-based resin component;

(3) A resin binder for toners which includes the crystalline resin as described in the above aspect (1) and a non-crystalline resin; and (4) A toner for electrophotography which includes the resin binder as described in the above aspect (3).

DETAILED DESCRIPTION OF THE INVENTION

A number of crystalline resins have been reported as a material having an excellent low-temperature fixing ability. However, when a non-crystalline resin and the crystalline resin are melted and mixed with each other to form crystals of the crystalline resin, a difference in melting point between the toner particles tends to occur owing to non-uniformity of sizes of the crystals thus formed, so that some toner particles may fail to be fully melted upon fixing depending upon a certain fixing temperature. For this reason, it is considered that problems such as deteriorated low-temperature fixing ability of toner and poor gloss and poor anti-filming property of resulting images are caused.

The present invention relates to a crystalline resin for toners which is capable of providing a toner that is excellent in not only low-temperature fixing ability of the toner but also gloss and anti-filming property of resulting images, a process for producing the crystalline resin for toners, a resin binder and a toner for electrophotography.

According to the present invention, it has been found that the above problems can be solved by using a crystalline resin composed of a composite resin containing a specific polycondensation-based resin component and a specific styrene-based resin component. That is, in the production step of crystals, after formation of crystal nuclei, the respective crystal nuclei undergo competitive growth into crystals. Therefore, it is considered that crystal growth in a moiety where a large number of crystal nuclei are present is terminated at the time at which each crystal nucleus comes into contact with the other crystal nuclei, whereas crystal growth in a moiety where only a small number of crystal nuclei are present is promoted until forming crystals having a larger size. As a result, the obtained crystals tend to be fluctuated in crystal size. However, in the crystalline resin for toners according to the present invention, it is considered that since the crystal nuclei can be uniformly and finely dispersed in the resin binder, the obtained crystals are free from fluctuation in size therebetween, thereby exhibiting the above suitable effects. This is because the crystalline resin of the present invention which is in the form of a composite resin containing the styrene-based resin component can be readily dispersed in the resin binder.

The crystalline resin for toners according to the present invention is preferably used as a resin binder in a toner for electrophotography. The toner for electrophotography according to the present invention (hereinafter occasionally referred to merely as a "toner") preferably contains the resin containing the above crystalline resin and a non-crystalline resin as resin binder.

The crystallinity of a resin may be expressed by a ratio of a softening point to an endothermic maximum peak temperature as measured by a differential scanning colorimeter (i.e., softening point/endothermic maximum peak temperature). In general, when the above ratio exceeds 1.4, the resin becomes non-crystalline, whereas when the ratio is less than 0.6, the resin exhibits a low crystallinity and contains a large amount of a non-crystalline portion. The crystallinity of the resin may be controlled according to kinds and blending ratios of raw monomers, production conditions (such as, e.g., reaction temperature, reaction time and cooling rate), etc. In the present invention, the "crystalline resin" means a resin in which the value of softening point/endothermic maximum peak temperature is in the range of from 0.6 to 1.4 and preferably from 0.8 to 1.2, whereas the "non-crystalline resin" means a resin in which the value of softening point/endothermic maximum peak temperature is more than 1.4 or less than 0.6. Meanwhile, the endothermic maximum peak temperature means a temperature of such a peak as located on a highest temperature side among endothermic peaks observed under the conditions used in the below-mentioned measuring method. When a difference between the endothermic maximum peak temperature and the softening point is within 20° C., the peak temperature is regarded as a melting point of the crystalline resin, whereas when the difference between the endothermic maximum peak temperature and the softening point exceeds 20° C., the peak is regarded as a peak attributed to a glass transition of the resin. Meanwhile, the "resin" as simply used herein means both a crystalline resin and a non-crystalline resin.

[Crystalline Resin for Toners]

The crystalline resin for toners according to the present invention is a composite resin which contains a polycondensation-based resin component obtained by polycondensing an alcohol component containing an aliphatic diol having 2 to 10 carbon atoms and a carboxylic acid component containing an aromatic dicarboxylic acid, and a styrene-based resin component.

(Polycondensation-Based Resin Component)

The polycondensation-based resin component constituting the crystalline resin for toners according to the present invention is a resin obtained by polycondensing an alcohol component containing an aliphatic diol having 2 to 10 carbon atoms with a carboxylic acid component containing an aromatic dicarboxylic acid, from the viewpoints of an excellent low-temperature fixing ability of the toner and excellent gloss and anti-filming property of the resulting toner images.

Examples of the polycondensation-based resin component include polyesters and polyester-polyamides. From the viewpoint of a good low-temperature fixing ability of the resulting toner, preferred are polyesters.

Alcohol Component

In the crystalline resin for toners according to the present invention, the alcohol component contains an aliphatic diol having 2 to 10 carbon atoms, preferably 4 to 8 carbon atoms and more preferably 4 to 6 carbon atoms from the viewpoint of enhancing a crystallinity of the resin.

Examples of the aliphatic diol having 2 to 10 carbon atoms include ethylene glycol, 1,2-propylene glycol, 1,3-propylene glycol, 1,4-butanediol, 1,5-pentanediol, 1,6-hexanediol, 1,7-heptanediol, 1,8-octanediol, 1,9-nonanediol, neopentyl glycol and 1,4-butenediol. Among these aliphatic diols, from the viewpoint of a high crystallinity, preferred are α,ω-linear alkanediols, more preferred are 1,4-butanediol and 1,6-hexanediol, and even more preferred is 1,6-hexanediol.

The content of the aliphatic diol having 2 to 10 carbon atoms, preferably 4 to 8 carbon atoms and more preferably 4 to 6 carbon atoms in the alcohol component is preferably 70 mol % or more, more preferably from 70 to 100 mol %, more preferably from 80 to 100 mol % and even more preferably from 90 to 100 mol % from the viewpoint of enhancing a crystallinity of the crystalline resin. In particular, it is desirable that the content of one kind of aliphatic diol among these aliphatic diols in the alcohol component is preferably 70 mol % or more and more preferably from 80 to 95 mol %, and it is more desirable that the content of 1,6-hexanediol in the alcohol component is preferably 70 mol % or more, more preferably from 70 to 100 mol % and even more preferably from 90 to 100 mol %.

Examples of the polyhydric alcohol other than the aliphatic diol having 2 to 10 carbon atoms which may be contained in the alcohol component include aromatic diols such as an alkyleneoxide adduct of bisphenol A represented by the following formula (I) including a polyoxypropylene adduct of 2,2-bis(4-hydroxyphenyl)propane and a polyoxyethylene adduct of 2,2-bis(4-hydroxyphenyl)propane; and trivalent or higher-valent alcohols such as glycerol, pentaerythritol and trimethylol propane.

These alcohol components may be used in combination of any two or more thereof.

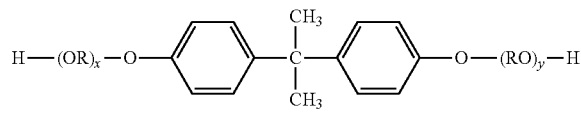

(I)

wherein R is an alkylene group having 2 or 3 carbon atoms; and x and y are respectively a positive number with the proviso that a sum of x and y is from 1 to 16 and preferably from 1.5 to 5.

Carboxylic Acid Component

In the above polycondensation-based resin component, the carboxylic acid component contains an aromatic dicarboxylic acid from the viewpoint of enhancing a gloss and an anti-filming property of the resulting images.

The aromatic dicarboxylic acid used in the present invention includes an aromatic dicarboxylic acid derivative capable of forming the same constitutional unit as that derived from the aromatic dicarboxylic acid by condensation reaction. As the aromatic dicarboxylic acid, from the same viewpoints as described above, there are preferably used, for example, aromatic dicarboxylic acids such as phthalic acid, isophthalic acid, terephthalic acid and anhydrides of these acids, as well as alkyl ($C_1$ to $C_3$) esters thereof. Examples of the alkyl group of the alkyl esters include methyl, ethyl, propyl and isopropyl. Among these aromatic dicarboxylic acids, terephthalic acid and alkyl ($C_1$ to $C_3$) esters thereof are preferred from the viewpoints of a good charging stability and a good low-temperature fixing ability of the resulting toner.

The content of the aromatic dicarboxylic acid in the carboxylic acid component is preferably from 70 to 100 mol %, more preferably from 80 to 100 mol % and more preferably from 90 to 100 mol % from the viewpoints of a good gloss and a good anti-filming property of the resulting images.

In the present invention, the carboxylic acid component may also contain, in addition to the aromatic dicarboxylic acid, the other divalent or trivalent or higher-valent carboxylic acid. Examples of the other divalent carboxylic acid include aliphatic dicarboxylic acids such as oxalic acid, malonic acid, maleic acid, fumaric acid, citraconic acid, itaconic acid, glutaconic acid, succinic acid, adipic acid, and succinic acids substituted with an alkyl group having 1 to 8 carbon atoms or 15 or more carbon atoms or an alkenyl group having 2 to 8 carbon atoms or 15 or more carbon atoms, as well as anhydrides and alkyl ($C_1$ to $C_3$) esters of these acids.

Examples of the trivalent or higher-valent polycarboxylic acid compound include aromatic carboxylic acids such as 1,2,4-benzenetricarboxylic acid (trimellitic acid), 2,5,7-naphthalenetricarobxylic acid and pyromellitic acid, as well as derivatives of these acids such as anhydrides and alkyl ($C_1$ to $C_3$) esters of these acids. Among these trivalent or higher-valent polycarboxylic acid compounds, from the viewpoints of inexpensiveness and facilitated reaction control, preferred are trimellitic acid and trimellitic anhydride.

These carboxylic acid components may be used in combination of any two or more thereof.

In the present specification, the below-mentioned bireactive monomer is excluded from calculation of content of the alcohol component or the carboxylic acid component.

The total molar amount of the aromatic dicarboxylic acid and the aliphatic diol having 2 to 10 carbon atoms, preferably 4 to 8 carbon atoms and more preferably 4 to 6 carbon atoms is preferably from 75 to 100 mol % and more preferably 85 to 100 mol % on the basis of the total molar amount of the carboxylic acid component and the alcohol component as the raw material components constituting the polycondensation-based resin component from the viewpoints of a good low-temperature fixing ability of the resulting toner as well as a good gloss and a good anti-filming property of the resulting images.

The molar ratio of the carboxylic acid component to the alcohol component (carboxylic acid component/alcohol component) in the polycondensation-based resin component is preferably controlled such that the amount of the alcohol component is larger than that of the carboxylic acid component in order to increase a molecular weight of the crystalline resin. Further, from the viewpoint of readily controlling a molecular weight of the resin by removal of the alcohol component upon the reaction under vacuum, the molar ratio is preferably not less than 0.6 but less than 1, more preferably not less than 0.7 but less than 1, even more preferably not less than 0.9 but less than 1 and further even more preferably not less than 0.95 but less than 1.

(Styrene-Based Resin Component)

As the raw monomers of the styrene-based resin component, there may be used styrene and a styrene derivative such as a-methyl styrene and vinyl toluene (styrene and the styrene derivative are hereinafter collectively referred to as a "styrene derivative").

The content of the styrene derivative in the raw monomers of the styrene-based resin component is preferably 70% by weight or more, more preferably 80% by weight or more and even more preferably 90% by weight or more, that is, preferably 70 to 100% by weight, more preferably 80 to 100% by weight and even more preferably 90 to 100% by weight from the viewpoint of a good anti-filming property.

Examples of the raw monomer other than the styrene derivative which may be contained in the styrene-based resin component include (meth)acrylic acid alkyl esters; ethylenically unsaturated monoolefins such as ethylene and propylene; diolefins such as butadiene; halovinyl compounds such as vinyl chloride; vinyl esters such as vinyl acetate and vinyl propionate; (meth)acrylic acid aminoalkyl esters such as dimethylaminoethyl (meth)acrylate; vinyl ethers such as vinyl methyl ether; vinylidene halides such as vinylidene chloride; and N-vinyl compounds such as N-vinyl pyrrolidone.

The above raw monomers of the styrene-based resin component may be used in combination of any two or more thereof. Meanwhile, the "(meth)acrylic acid" as used herein means acrylic acid and/or methacrylic acid.

Among the raw monomers of the styrene-based resin component, (meth)acrylic acid alkyl esters are preferred from the viewpoints of a good low-temperature fixing ability and a good charging stability of the resulting toner. From the same viewpoints as described above, the number of carbon atoms contained in the alkyl group of the (meth)acrylic acid alkyl esters is preferably from 1 to 22, more preferably from 4 to 18 and even more preferably from 8 to 18. Meanwhile, the number of carbon atoms in the alkyl ester means the number of carbon atoms derived from the alcohol component constituting the ester.

Specific examples of the (meth)acrylic alkyl esters include methyl (meth)acrylate, ethyl(meth)acrylate, (iso)propyl (meth)acrylate, 2-hydroxyethyl (meth)acrylate, (iso- or tertiary-)butyl(meth)acrylate, 2-ethylhexyl (meth)acrylate, (iso)octyl(meth)acrylate, (iso)decyl(meth)acrylate and (iso)stearyl(meth)acrylate. Meanwhile, the terms "(iso- or tertiary-)" and "(iso)" as used herein mean both the structure in which the groups expressed by "iso" and "tertiary" are present, and the structure in which these groups are not present (i.e., normal), and the "(meth)acrylate" means acrylate, methacrylate or both thereof.

The content of the (meth)acrylic alkyl ester in the raw monomers of the styrene-based resin component is preferably 30% by weight or less, more preferably 20% by weight or less and even more preferably 10% by weight or less from the viewpoints of a good low-temperature fixing ability of the toner and a good gloss and a good anti-filming property of the resulting toner images.

Meanwhile, the resin obtained by subjecting the raw monomers including the styrene derivative and the (meth)acrylic acid alkyl ester to addition polymerization is also referred to as a "styrene-(meth)acrylic resin".

The addition polymerization reaction between the raw monomers of the styrene-based resin component may be carried out by an ordinary method, for example, in an organic solvent or under a solvent-free condition in the presence of a polymerization initiator, a crosslinking agent, etc. The temperature used in the addition polymerization reaction is preferably from 110 to 200° C. and more preferably from 140 to 170° C.

Examples of the organic solvent which may be used in the addition polymerization reaction include xylene, toluene, methyl ethyl ketone and acetone. The amount of the organic solvent used is preferably from about 10 to about 50 parts by weight on the basis of 100 parts by weight of the raw monomers of the styrene-based resin component.

The glass transition temperature (Tg) of the styrene-based resin component is preferably from 60 to 130° C., more preferably from 80 to 120° C. and even more preferably from 90 to 110° C. in order to exhibit an excellent anti-filming effect of the resulting toner images.

As the glass transition temperature (Tg) of the styrene-based resin component, there may be used the value calculated from Tgn of a homopolymer of the respective monomers constituting each polymer according to the following formula (I) as Fox formula (T. G. Fox, Bull. Am. Physics Soc., Vol. 1, No. 3, p. 123 (1956)) which is an empirical formula referred to as a thermal additivity formula of polymers for estimating a glass transition temperature thereof.

$$1/Tg = \Sigma(Wn/Tgn) \quad (1)$$

wherein Tgn is Tg represented by an absolute temperature of a homopolymer of each component; and Wn is a weight fraction of each component.

Meanwhile, in the present specification, the below-mentioned bireactive monomer is excluded from calculation of content of the styrene-based resin component, and is not used for calculation of glass transition temperature of the styrene-based resin component.

When calculating the glass transition temperature (Tg) in the Fox formula used in the Examples of the present invention, there are used Tg of styrene: 373 K and Tg of 2-ethylhexylacrylic acid: 223 K.

(Composite Resin)

The crystalline resin for toners according to the present invention is composed of the composite resin containing the polycondensation-based resin component and the styrene-based resin component in which the respective components are bonded to each other either directly or through a linking group. Examples of the linking group include compounds derived from the below-mentioned bireactive monomer, a chain transfer agent, etc., and the other resins.

The composite resin is a resin in which the polycondensation-based resin component and the styrene-based resin component are mutually dispersed. The dispersing conditions of the respective components may be evaluated by the difference between the measured value of Tg derived from the styrene-based resin component in the composite resin and the Tg value calculated according to the Fox formula, as described below.

More specifically, the composite resin used in the present invention is in the form of a crystalline resin, but has a non-crystalline portion derived from the styrene-based resin component and the polycondensation-based resin component, so that Tg of the composite resin is measurable. Tg of the polycondensation-based resin component and Tg of the styrene-based resin component are separate measured values. However, as dispersion of the polycondensation-based resin component and the styrene-based resin component proceeds, both Tg values mutually approach to each other. Under the dispersion state in which the polycondensation-based resin component and the styrene-based resin component are substantially uniformly dispersed, both the Tg values are overlapped. As a result, it is considered that almost only one Tg value is measured for the composite resin.

Accordingly, under the dispersion state in which the styrene-based resin component and the polycondensation-based resin component are mutually dispersed, Tg derived from the styrene-based resin component in the composite resin as measured under the below-mentioned conditions is different from the Tg value of the styrene-based resin component as calculated according to the Fox formula. More specifically, the measured Tg value preferably differs from the calculated Tg by 10° C. (Tg±10° C.) or more, more preferably by 30° C. (Tg±30° C.) or more. In general, since Tg of the polycondensation-based resin component is lower than Tg of the styrene-based resin component, the measured Tg value of the styrene-based resin component is frequently lower than the calculated Tg value of the styrene-based resin component.

The composite resin may be produced by the method (1) in which the raw monomers of the polycondensation-based resin component are polycondensed in the presence of a styrene-based resin containing a carboxyl group or a hydroxyl group (which may be a carboxyl group or a hydroxyl group derived from the below-mentioned bireactive monomer, a chain transfer agent, etc.), the method (2) in which the raw monomers of the styrene-based resin component are subjected to addition polymerization in the presence of a polycondensation-based resin containing a reactive unsaturated bond, or the like method.

The composite resin is preferably in the form of a resin (hybrid resin) obtained by using, in addition to the polycondensation-based resin component and the styrene-based resin component, a bireactive monomer capable of reacting with both the raw monomers of the polycondensation-based resin component and the raw monomers of the styrene-based resin component, from the viewpoint of enhancing a low-temperature fixing ability of the resulting toner as well as a gloss and an anti-filming property of the resulting images. Therefore, when obtaining the composite resin by respectively polymerizing the raw monomers of the polycondensation-based resin component and the raw monomers of the styrene-based resin component, the polycondensation reaction and/or the addition polymerization reaction are preferably carried out in the presence of the bireactive monomer. This method enables production of the composite resin in the form of a resin (hybrid resin) in which the polycondensation-based resin component and the styrene-based resin component are bonded to each other through the constitutional unit derived from the bireactive monomer, so that the polycondensation-based resin component and the styrene-based resin component are more finely and uniformly dispersed in the composite resin.

For these reasons, the composite resin is preferably produced by polymerizing (a) the raw monomers of the polycondensation-based resin component which includes the alcohol component containing an aliphatic diol having 2 to 10 carbon atoms and the carboxylic acid component containing an aromatic dicarboxylic acid, (b) the raw monomers of the styrene-based resin component, and (c) the bireactive monomer capable of reacting with both the raw monomers of the polycondensation-based resin component and the raw monomers of the styrene-based resin component.

The bireactive monomer is preferably in the form of a compound containing preferably at least one functional group selected from the group consisting of a hydroxyl group, a carboxyl group, an epoxy group, a primary amino group and a secondary amino group, more preferably a hydroxyl group and/or a carboxyl group and even more preferably a carboxyl group and an ethylenically unsaturated bond, in a molecule thereof. The use of such a bireactive monomer enables the resin as a dispersed phase to exhibit an enhanced dispersibility. The bireactive monomer is preferably at least one compound selected from the group consisting of acrylic acid, methacrylic acid, fumaric acid, maleic acid and maleic anhydride. Among these monomers, from the viewpoint of a good reactivity of the polycondensation reaction and addition polymerization reaction, preferred are acrylic acid, methacrylic acid and fumaric acid. However, the polycarboxylic acid such as fumaric acid may be sometimes functioned as a polycondensation-based monomer when used together with a polymerization initiator.

From the viewpoints of enhancing a dispersibility between the styrene-based resin component and the polycondensation-based resin component as well as improving not only a gloss of the resulting images but also a low-temperature fixing ability and an anti-filming property thereof, the amount of the bireactive monomer used is preferably from 1 to 20 mol, more preferably from 2 to 15 mol and even more preferably from 5 to 13 mol per 100 mol of a total amount of the alcohol component of the polycondensation-based resin component [(moles of the bireactive monomer/total moles of the alcohol component of the polycondensation-based resin component)×100]. Also, from the same viewpoints, the amount of the bireactive monomer used is preferably from 2 to 25 mol, more preferably from 6 to 22 mol and even more preferably from 10 to 20 mol per 100 mol of a total amount of the raw monomers of the styrene-based resin component [(moles of the bireactive monomer/total moles of the raw monomers of the styrene-based resin component)×100].

More specifically, the composite resin is preferably produced by the following method. The bireactive monomer is preferably subjected together with the raw monomers of the styrene-based resin component to addition polymerization reaction from the viewpoint of enhancing a gloss of the resulting toner.

(i) The method in which after a step (A) of subjecting the raw monomers of the polycondensation-based resin component to polycondensation reaction, a step (B) of subjecting the raw monomers of the styrene-based resin component and the bireactive monomer to addition polymerization reaction is carried out.

In this method (i), the step (A) is carried out at a temperature suitable for the polycondensation reaction, and then the reaction temperature is lowered to a temperature suitable for the addition polymerization reaction at which the step (B) is carried out. The raw monomers of the styrene-based resin component and the bireactive monomer are preferably added to the reaction system at the temperature suitable for the addition polymerization reaction when a. The bireactive monomer undergoes not only the addition polymerization reaction but also the reaction with the polycondensation-based resin component.

After completion of the step (B), the reaction temperature is raised again, if required with addition of trivalent or higher-valent raw monomers of a polycondensation-based resin component, etc., as a crosslinking agent to the polymerization reaction system, so that the polycondensation reaction in the step (A) and the reaction with the bireactive monomer can further proceed.

(ii) The method in which after the step (B) of subjecting the raw monomers of the styrene-based resin component and the bireactive monomer to addition polymerization reaction, the step (A) of subjecting the raw monomers of the polycondensation-based resin component to polycondensation reaction is carried out.

In this method (ii), the step (B) is carried out at a temperature suitable for the addition polymerization reaction, and then the reaction temperature is raised to a temperature suitable for the polycondensation reaction at which the polycondensation reaction of the step (A) is carried out. The bireactive monomer undergoes not only the addition polymerization reaction but also the polycondensation reaction.

The raw monomers of the polycondensation-based resin component may be present in the reaction system upon the addition polymerization reaction, or may be added to the reaction system at a temperature suitable for the polycondensation reaction. In the former case, the condition of the reaction system may be well controlled by adding an esterification catalyst thereto at a temperature suitable for the polycondensation reaction.

(iii) The method in which the step (A) of subjecting the raw monomers of the polycondensation-based resin component to polycondensation reaction and the step (B) of subjecting the raw monomers of the styrene-based resin component and the bireactive monomer to addition polymerization reaction are carried out in parallel.

In this method (iii), preferably, after the steps (A) and (B) are carried out at a reaction temperature suitable for the addition polymerization reaction, the reaction temperature is raised to at a temperature suitable for the polycondensation reaction, if required with addition of trivalent or higher-valent raw monomers of a polycondensation-based resin component, etc., as a crosslinking agent to the polymerization reaction system, whereby the polycondensation reaction of the step (A) is further carried out. In this case, under the temperature condition suitable for the polycondensation reaction, a radical polymerization inhibitor may be added to allow only the polycondensation reaction to proceed. The bireactive monomer undergoes not only the addition polymerization reaction but also the polycondensation reaction.

In the above method (i), a polycondensation-based resin previously produced by polymerization may be used in place of conducting the polycondensation reaction of the step (A). In the method (iii), when conducting the steps (A) and (B) in parallel, a mixture containing the raw monomers of the styrene-based resin component may be added dropwise to a mixture containing the raw monomers of the polycondensation-based resin component to react the raw monomers of both the components.

The above respective methods (i) to (iii) may be preferably carried out in the same reaction vessel.

The crystalline resin for toners according to the present invention is composed of the above composite resin. The weight ratio of the polycondensation-based resin component to the styrene-based resin component in the composite resin [in the present invention, this means a weight ratio of the raw monomers of the polycondensation-based resin component to the raw monomers of the styrene-based resin component (total amount of the raw monomers of the polycondensation-based resin component/total amount of the raw monomers of the styrene-based resin component)] is preferably from 50/50 to 95/5, more preferably from 60/40 to 90/10, more preferably from 65/35 to 90/10 and even more preferably from 70/30 to 88/12 because the polycondensation-based resin and the styrene-based resin preferably constitute a continuous phase and a dispersed phase, respectively, from the viewpoints of a good low-temperature fixing ability of the resulting toner as well as a good gloss and a good anti-filming property of the resulting images. Meanwhile, upon calculation of the weight ratio, the amount of the bireactive monomer is involved in the amount of the raw monomers of the polycondensation-based resin component.

The number-average molecular weight of the crystalline resin for toners according to the present invention is preferably 2,000 or more, and more preferably 4,000 or more from the viewpoints of a good low-temperature fixing ability of the resulting toner as well as a good gloss and a good anti-filming property of the resulting images. However, in view of a productivity of the crystalline resin, the number-average molecular weight is preferably 10,000 or less, more preferably 9,000 or less and even more preferably 8,000 or less.

Also, from the same viewpoints as described above, the weight-average molecular weight of the crystalline resin is preferably 9,000 or more, more preferably 20,000 or more and even more preferably 60,000 or more, but is preferably 10,000,000 or less, more preferably 6,000,000 or less, even more preferably 4,000,000 or less and further even more preferably 1,000,000 or less.

Meanwhile, in the present invention, the number-average molecular weight and the weight-average molecular weight of the crystalline resin both mean the values measured with respect to chloroform-soluble components thereof.

The storage elastic modulus (G') of the crystalline resin at 160° C. is preferably from 100 to 100,000, more preferably from 500 to 20,000, even more preferably from 1,000 to 10,000 and further even more preferably from 2,000 to 10,000 from the viewpoint of a good anti-filming property of the resulting toner images.

In order to obtain the crystalline resin having such a high molecular weight, the molar ratio between the carboxylic acid component and the alcohol component may be controlled as described above, or the suitable reaction conditions such as use of elevated reaction temperature, increase in amount of the catalyst used, reaction under reduced pressure, and prolonged dehydration reaction time may be appropriately selected. Meanwhile, the crystalline resin having the high molecular weight may also be produced by using a high-output motor. However, in the case where the resin is produced without selection of any special production facilities, it is effective to use such a method in which the raw monomers are reacted in the presence of a non-reactive low-viscous resin or a solvent.

From the viewpoint of a good low-temperature fixing ability and a good anti-filming property of the resulting toner, the softening point of the crystalline resin is preferably from 80 to 160° C., more preferably from 80 to 140° C., even more preferably from 90 to 130° C. and further even more preferably from 100 to 120° C.

Also, from the viewpoint of a good low-temperature fixing ability and a good anti-filming property of the resulting toner, the melting point of the crystalline resin is preferably from 60 to 130° C., more preferably from 75 to 120° C. and even more preferably from 90 to 110° C.

The softening point and the melting point of the crystalline resin may be readily controlled by suitably adjusting a composition of the raw monomers, a polymerization initiator, a molecular weight of the resin, an amount of the catalyst used, etc., or suitably selecting the reaction conditions.

[Resin Binder for Toners]

The crystalline resin for toners according to the present invention is preferably used as a resin binder in the form of a mixture with a non-crystalline resin, for example, from the viewpoint of maintaining a good solution viscosity thereof when melt-kneaded upon production of the toner.

Thus, the resin binder for toners according to the present invention contains both the crystalline resin and the non-crystalline resin.

The acid value of each of the crystalline resin, the non-crystalline resin and the resin binder containing these resins is preferably from 1 to 40 mg KOH/g, more preferably from 2 to 35 mg KOH/g and even more preferably from 3 to 30 mg KOH/g from the viewpoints of a good chargeability and a good hydrolysis resistance of the resulting toner.

In addition, the crystalline resin, the non-crystalline resin and the resin binder containing these resins preferably have an excellent solubility in an organic solvent.

In the resin binder for toners according to the present invention, the weight ratio of the crystalline resin to the non-crystalline resin (crystalline resin/non-crystalline resin) is preferably from 5/95 to 50/50, more preferably from 10/90 to 40/60, even more preferably from 10/90 to 30/70 and further even more preferably from 15/85 to 25/75 from the viewpoints of a good low-temperature fixing ability of the toner and a good gloss of the resulting toner images.

When using the resin binder for toners according to the present invention, it is possible to produce a toner for electrophotography which is excellent in not only low-temperature fixing ability but also gloss and anti-filming property of the resulting toner images.

The resin binder according to the present invention may be used in combination with other known resin binders for toners such as, for example, polyesters, styrene-based resins such as styrene-acryl resins, epoxy resins, polycarbonates and polyurethanes unless the use of these resins adversely affects the aimed effects of the present invention. The content of the resin binder for toners according to the present invention is preferably 30% by weight or more, more preferably 50% by weight or more, even more preferably 70% by weight or more, further even more preferably 80% by weight or more, further even more preferably 90% by weight or more, and most preferably substantially 100% by weight on the basis of a total weight of the resin binders.

(Non-Crystalline Resin)

The non-crystalline resin is preferably a polycondensation-based resin obtained by polycondensing an alcohol component with a carboxylic acid component.

Alcohol Component

The non-crystalline resin used in the present invention is preferably a resin obtained by polycondensing the alcohol component containing 70 mol % or more of an alkyleneoxide adduct of bisphenol A represented by the above formula (I) with the carboxylic acid component.

The content of the alkyleneoxide adduct of bisphenol A in the alcohol component is preferably 70 mol % or more, more preferably from 80 to 100 mol % and even more preferably from 90 to 100 mol %. In the present invention, the use of the alkyleneoxide adduct of bisphenol A serves for improving an environmental stability of the toner.

Examples of an alcohol other than the alkyleneoxide adduct of bisphenol A which may be contained in the alcohol component include the same polyhydric alcohols as used for the above crystalline resin.

Carboxylic Acid Component

The carboxylic acid component preferably contains the above aromatic dicarboxylic acid, more preferably terephthalic acid. The content of the aromatic dicarboxylic acid in the carboxylic acid component is preferably from 30 to 95 mol %, more preferably from 40 to 90 mol % and even more preferably from 50 to 85 mol %.

Examples of a polycarboxylic acid compound other than the aromatic dicarboxylic acid which may be contained in the carboxylic acid component include the same polycarboxylic acid compounds as used for the above crystalline resin.

Properties of Non-Crystalline Resin

From the viewpoint of a good fixing ability, the softening point of the non-crystalline resin used in the present invention is preferably from 70 to 180° C. and more preferably from 90 to 150° C. The non-crystalline resin used in the present invention can exhibit a more excellent property from the above viewpoint by using a higher-softening point resin in combination with a lower-softening point resin. More specifically, the softening point of the higher-softening point resin is preferably from 120 to 150° C., whereas the softening point of the lower-softening point resin is preferably from 90 to 120° C., and further it is preferred that the softening points of the two kinds of resins be different by 10° C. or more from each other. The weight ratio of the higher-softening point resin to the lower-softening point resin (higher-softening point resin/lower-softening point resin) is preferably from 1/3 to 3/1 and more preferably from 1/2 to 2/1.

From the viewpoint of a good fixing ability, the glass transition temperature of the non-crystalline resin is preferably from 45 to 80° C. and more preferably from 55 to 75° C. Meanwhile, the glass transition temperature is a property inherent to non-crystalline resins, and distinguished from a maximum peak temperature owing to heat of fusion.

The number-average molecular weight of the non-crystalline resin is preferably from 1,000 to 6,000 and more preferably from 2,000 to 5,000. Also, the weight-average molecular weight of the non-crystalline resin is preferably 10,000 or more, and more preferably 30,000 or more, but is preferably 1,000,000 or less. Meanwhile, the number-average molecular weight and the weight-average molecular weight of the non-crystalline resin both are the values as measured with respect to tetrahydrofuran-soluble components contained therein.

Resin-Modified Resin

In the present invention, the non-crystalline resin containing the resin obtained by polycondensing the alcohol component with the carboxylic acid component may also include a resin-modified resin.

Examples of the resin-modified resin include urethane-modified polyesters obtained by modifying the resin with a urethane bond, epoxy-modified polyesters obtained by modifying a polyester with an epoxy bond, and hybrid resins containing two or more kinds of resin components including a polyester component.

The non-crystalline polyester used in the present invention may be constituted of either one or both of the polyester and the modified resin thereof. More specifically, the non-crystalline resin may be the polyester solely and/or the hybrid resin composed of the polyester component and the styrene-based resin component.

(Polycondensation Reaction)

Upon production of any of the crystalline resin and the non-crystalline resin, the alcohol component and the carboxylic acid component are preferably subjected to polycondensation reaction in the presence of an esterification catalyst. From the viewpoint of obtaining a resin having a high storage elastic modulus, the polycondensation reaction is preferably conducted in the presence of both the esterification catalyst and a pyrogallol compound.

Examples of the esterification catalyst suitably used in the polycondensation reaction include titanium compounds and tin (II) compounds containing no Sn—C bond. These titanium and tin compounds as the esterification catalyst may be respectively used alone or in combination thereof. The titanium compound is preferably a titanium compound having a Ti—O bond and more preferably a titanium compound containing an alkoxy group, an alkenyloxy group or an acyloxy group having 1 to 28 carbon atoms in total.

Specific examples of the titanium compound include titanium diisopropylate bis(triethanol aminate) [$Ti(C_6H_{14}O_3N)_2(C_3H_7O)_2$], titanium diisopropylate bis(diethanol aminate) [$Ti(C_4H_{10}O_2N)_2(C_3H_7O)_2$], titanium dipentylate bis(triethanol aminate) [$Ti(C_6H_{14}O_3N)_2(C_5H_{11}O)_2$], titanium diethylate bis(triethanol aminate) [$Ti(C_6H_{14}O_3N)_2(C_2H_5O)_2$], titanium dihydroxyoctylate bis(triethanol aminate) [$Ti(C_6H_{14}O_3N)_2(OHC_8H_{16}O)_2$], titanium distearate bis(triethanol aminate) [$Ti(C_6H_{14}O_3N)_2(C_{18}H_{37}O)_2$], titanium triisopropylate triethanol aminate [$Ti(C_6H_{14}O_3N)_1(C_3H_7O)_3$] and titanium monopropylate tris(triethanol aminate) [$Ti(C_6H_{14}O_3N)_3(C_3H_7O)_1$]. Among these titanium compounds, preferred are titanium diisopropylate bis(triethanol aminate), titanium diisopropylate bis(diethanol aminate) and titanium dipentylate bis(triethanol aminate). These titanium compounds are also available, for example, as commercial products marketed from Matsumoto Trading Co., Ltd.

Specific examples of the other suitable titanium compounds include tetra-n-butyl titanate [$Ti(C_4H_9O)_4$], tetrapropyl titanate [$Ti(C_3H_7O)_4$], tetrastearyl titanate [$Ti(C_{18}H_{37}O)_4$], tetramyristyl titanate [$Ti(C_{14}H_{29}O)_4$], tetraoctyl titanate [$Ti(C_8H_{17}O)_4$], dioctyldihydroxyoctyl titanate [$Ti(C_8H_{17}O)_2(OHC_8H_{16}O)_2$] and dimyristyl dioctyl titanate [$Ti(C_{14}H_{29}O)_2(C_8H_{17}O)_2$]. Among these other suitable titanium compounds, preferred are tetrastearyl titanate, tetramyristyl titanate, tetraoctyl titanate and dioctyldihydroxyoctyl titanate. These titanium compounds may be produced, for example, by reacting a titanium halide with a corresponding alcohol, and are also available as commercial products marketed from Nisso Co., Ltd.

Examples of the preferred tin (II) compound containing no Sn—C bond include tin (II) compounds having a Sn—O bond and tin (II) compounds having a Sn—X bond wherein X represents a halogen atom. Among these tin compounds, preferred are tin (II) compounds having a Sn—O bond.

Examples of the tin (II) compound having a Sn—O bond include tin (II) carboxylates containing a carboxyl group having 2 to 28 carbon atoms such as tin (II) oxalate, tin (II) diacetate, tin (II) dioctanoate, tin (II) dilaurate, tin (II) distearate and tin (II) dioleate; dialkoxy tin (II) containing an alkoxy group having 2 to 28 carbon atoms such as dioctyloxy tin (II), dilauryloxy tin (II), distearoxy tin (II) and dioleyloxy tin (II); tin (II) oxide; and tin (II) sulfate.

Examples of the tin (II) compound having a Sn—X bond wherein X represents a halogen atom include tin (II) halides such as tin (II) chloride and tin (II) bromide. Among these tin (II) compounds, in view of a good charging raise-up effect and a good catalyst performance, preferred are fatty acid tin (II) salts represented by the formula: $(R^1COO)_2Sn$ (wherein $R^1$ is an alkyl or alkenyl group having 5 to 19 carbon atoms), dialkoxy tin (II) compounds represented by the formula: $(R^2O)_2Sn$ (wherein $R^2$ is an alkyl or alkenyl group having 6 to 20 carbon atoms), and tin (II) oxide represented by the formula: SnO, more preferred are fatty acid tin (II) salts represented by the formula: $(R^1COO)_2Sn$ and tin (II) oxide, and even more preferred are tin (II) dioctanoate, tin (II) distearate and tin (II) oxide.

The above titanium compounds and the tin (II) compounds may be respectively used alone or in combination of any two or more thereof.

The amount of the esterification catalyst being present in the reaction system is preferably from 0.01 to 1.0 part by weight and more preferably from 0.1 to 0.6 part by weight on the basis of 100 parts by weight of a total amount of the alcohol component and the carboxylic acid component.

Also, the pyrogallol compound is a compound containing a benzene ring in which three hydrogen atoms adjacent to each other are respectively substituted with a hydroxyl group. Examples of the pyrogallol compound include pyrogallol, gallic acid, gallic acid esters, benzophenone derivatives such as 2,3,4-trihydroxybenzophenone and 2,2',3,4-tetrahydroxybenzophenone, and catechin derivatives such as epigallocatechin and epigallocatechin gallate.

The amount of the pyrogallol compound being present in the polycondensation reaction system is preferably from 0.001 to 1.0 part by weight, more preferably from 0.005 to 0.4 part by weight and even more preferably from 0.01 to 0.2 part by weight on the basis of 100 parts by weight of the raw monomers supplied to the polycondensation reaction. The "amount of the pyrogallol compound being present" as used herein means a total blending amount of the pyrogallol compound supplied to the polycondensation reaction.

The weight ratio of the pyrogallol compound to the esterification catalyst (pyrogallol compound/esterification catalyst) is preferably from 0.01 to 0.5, more preferably from 0.03 to 0.3 and even more preferably from 0.05 to 0.2 from the viewpoint of a good durability of the resulting resin.

Upon production of any of the crystalline resin and the non-crystalline resin, the polycondensation reaction of the alcohol component with the carboxylic acid component may be carried out, for example, in an inert gas atmosphere in the presence of the esterification catalyst such as tin compounds and titanium compounds, a polymerization inhibitor, etc. The temperature used in the polycondensation reaction is preferably from 180 to 250° C. for the non-crystalline resin and from 120 to 230° C. for the crystalline resin.

More specifically, for example, the whole monomers may be charged at one time in order to enhance a strength of the obtained resin. Alternatively, there may also be used a method of first reacting the divalent monomers and then adding the trivalent or higher-valent monomers to the obtained reaction product to react therewith in order to reduce a content of low-molecular weight components therein. Further, the reaction may be promoted by reducing a pressure of the reaction system in the later half of the polymerization.

[Toner for Electrophotography]

The toner for electrophotography according to the present invention contains the above resin binder for toners.

The toner for electrophotography according to the present invention may further contain appropriate additives. Examples of the additives include a colorant, a releasing agent, a charge controlling agent, a magnetic powder, a flow modifier, a conductivity controlling agent, an extender pigment, a reinforcing filler such as fibrous substances, an antioxidant, an anti-aging agent and a cleanability improver.

As the colorant, there may be used any suitable dyes, pigments, etc., which have been conventionally used as a colorant for toners. Specific examples of the colorant include carbon blacks, black pigments, Phthalocyanine Blue, Permanent Brawn FG, Brilliant Fast Scarlet, Pigment Green B, Rhodamine B Base, Solvent Red 49, Solvent Red 146, Solvent Blue 35, quinacridone, Carmine 6B, isoindoline and disazo yellow. These colorants may be used alone or in the form of a mixture of any two or more thereof. The toner of the present invention may be either a black toner or a color toner. The content of the colorant in the toner is preferably from 1 to 40 parts by weight and more preferably from 2 to 10 parts by weight on the basis of 100 parts by weight of the resin binder.

Examples of the charge controlling agent include chromium-based azo dyes, iron-based azo dyes, aluminum-based azo dyes and metal complexes of salicylic acid. These charge controlling agents may be used alone or in the form of a mixture of any two or more thereof.

The content of the charge controlling agent in the toner is preferably from 0.1 to 8 parts by weight and more preferably from 0.5 to 7 parts by weight on the basis of 100 parts by weight of the resin binder.

Examples of the releasing agent include polyolefin waxes, paraffin waxes and silicones; fatty acid amides such as oleamide, erucamide, ricinolamide and stearamide; vegetable waxes such as carnauba wax, rice wax, candelilla wax, haze wax and jojoba oil; animal waxes such as beeswax; and mineral and petroleum waxes such as montan wax, ozokerite, ceresin, microcrystalline wax and Fischer-Tropsch wax. These releasing agents may be used alone or in the form of a mixture of any two or more thereof.

The melting point of the releasing agent is preferably from 60 to 160° C. and more preferably from 60 to 150° C. in view of a good low-temperature fixing ability and a good anti-offset property of the resulting toner.

The content of the releasing agent in the toner is preferably from 0.5 to 10 parts by weight, more preferably from 1 to 8 parts by weight and even more preferably from 1.5 to 7 parts by weight on the basis of 100 parts by weight of the resin binder in view of a good dispersibility in the resin binder.

The toner of the present invention may be produced by any conventionally known method such as a melt-kneading method, an emulsification phase inversion method and a polymerization method. From the viewpoints of a good productivity of the toner and a good dispersibility of the colorant therein, a pulverized toner produced by a melt-kneading method is preferably used. In the melt-kneading method, the pulverized toner may be produced, for example, by uniformly mixing raw materials such as the resin binder, the colorant, the charge controlling agent, the releasing agent, etc., in a mixer such as a Henschel mixer, and then melt-kneading the resulting mixture using a closed-type kneader, a single- or twin-screw extruder, an open roll-type kneader, etc., followed by subjecting the resulting kneaded material to cooling, pulverization and classification. On the other hand, from the viewpoint of reduction in size of the toner, the polymerization method is preferably used to produce the toner.

The volume median particle size ($D_{50}$) of the toner of the present invention is preferably from 3 to 15 μm and more preferably from 3 to 10 μm. Meanwhile, in the present specification, the volume median particle size ($D_{50}$) used herein means a particle size at which a cumulative volume frequency calculated on the basis of a volume fraction of particles from a smaller particle size side thereof is 50%.

An appropriate external additive may be added to a surface of the toner. Examples of the external additive include fine inorganic particles such as fine silica particles, fine alumina particles, fine titanium oxide particles, fine zirconia particles, fine tin oxide particles and fine zinc oxide particles; and fine organic particles such as fine resin particles. The surface of the external additive may be subjected to hydrophobic treatment. The amount of the external additive added is preferably from 0.05 to 5 parts by weight on the basis of 100 parts by weight of the toner particles before treated with the external additive.

The toner for electrophotography according to the present invention can be used as not only one-component type developer but also two-component type developer in the form of a mixture with a carrier.

When using the crystalline resin for toners according to the present invention, it is possible to provide a toner for electrophotography which is excellent in not only low-temperature fixing ability but also gloss and anti-filming property of the resulting images.

In addition, since the toner produced using the crystalline resin according to the present invention is thus excellent in low-temperature fixing ability as well as gloss and anti-filming property of the resulting images, the toner of the present invention can be suitably used as a toner for electrophotography which is employed in electrophotography, an electrostatic recording method, an electrostatic printing method or the like.

The present invention is described in more detail by referring to the following examples, etc. However, it should be noted that these examples, etc., are only illustrative and not intended to limit the invention thereto.

[Measurement and Evaluation for Properties of Resin]

The softening point, glass transition temperature, melting point, acid value, storage elastic modulus and crystal size distribution of the resin obtained in the respective Examples, etc., were measured and evaluated by the following methods.

(Softening Point)

Using a flow tester "CFT-500D" available from Shimadzu Corporation, 1 g of a sample was extruded through a nozzle having a die pore size of 1 mm and a length of 1 mm while heating the sample at a temperature rise rate of 6° C./min and applying a load of 1.96 MPa thereto with a plunger of the flow tester. The softening point of the sample was determined as a temperature at which a half amount of the sample flowed out when plotting a downward movement of the plunger relative to temperature.

(Endothermic Maximum Peak Temperature: Melting Point)

Using a differential scanning calorimeter "Q-100" available from T.A. Instruments, Japan, Ltd., a sample was cooled from room temperature to 0° C. at a temperature drop rate of 10° C./min, allowed to stand as such at 0° C. for 1 min, and then heated up to 150° C. at a temperature rise rate of 10° C./min to measure an endothermic curve thereof. The temperature of the peak present on the highest temperature side among the endothermic peaks observed in the curve was determined as the endothermic maximum peak temperature. If the difference between the maximum peak temperature and the softening point fell within 20° C., the maximum peak temperature was determined as the melting point of a crystalline resin.

(Glass Transition Temperature of Crystalline Resin (Composite Resin))

Using a differential scanning calorimeter "Q-100" available from T.A. Instruments, Japan, Inc., 0.01 to 0.02 g of a sample weighed on an aluminum pan was heated to 200° C., cooled from 200° C. to −80° C. at a temperature drop rate of 100° C./min and further heated at a temperature rise rate of 1° C./min under a modulated mode to prepare an endothermic curve thereof. The glass transition temperature of the sample was determined from the endothermic curve, as the temperature at which an extension of a base line below the endothermic maximum peak temperature intersects a tangential line having a maximum inclination in a region from a raise-up portion to an apex of the peak in the curve.

(Glass Transition Temperature of Non-Crystalline Resin)

Using a differential scanning calorimeter "Q-100" available from T.A. Instruments, Japan, Ltd., 0.01 to 0.02 g of a sample weighed on an aluminum pan was heated to 200° C., cooled from 200° C. to 0° C. at a temperature drop rate of 10° C./min and further heated at a temperature rise rate of 10° C./min to prepare an endothermic curve thereof. The glass transition temperature of the sample was determined from the endothermic curve, as the temperature at which an extension of a base line below the endothermic maximum peak temperature intersects a tangential line having a maximum inclination in a region from a raise-up portion to an apex of the peak in the curve.

(Acid Value)

Measured according to JIS K0070. However, with respect to only a solvent used for the measurement, the mixed solvent of ethanol and ether as prescribed in JIS K0070 was changed to a mixed solvent containing acetone and toluene at a volume ratio of 1:1.

(Storage Elastic Modulus of Resin)

The storage elastic modulus of the resin was measured using a viscoelasticity measuring apparatus "ARES" available from T.A. Instrument under the following conditions.

Measuring jig: Parallel plates; upper and lower (diameter: 25 mm)

Amount of sample measured: 1 g

Measuring frequency: 2 rad/sec

Measuring strain: 0.5%

Measuring temperature: The sample was heated from 100° C. to 160° C. at a temperature rise rate of 5° C./min and the storage elastic modulus of the sample was measured at 160° C. five times to calculate an average value of the measured five values.

(Crystal Size Distribution)

Using a "nano-Thermal Analysis" available from Nippon thermal Analysis Co., Ltd., the crystal size distribution of the resin binder was determined by observing the resin particles at optional 10 points of a visual filed of 100 μm×100 μm on the AFM image to measure thermal characteristics of the particles. The "nano-Thermal Analysis" is an apparatus capable of measuring thermal characteristics of a microfine portion by high-speed heating, and determining whether or not the microfine portion includes crystals of a crystalline resin by measuring a melting point of the microfine portion. In addition, a maximum melting point and a minimum melting point among those measured at the 10 points were determined. The smaller difference between the maximum melting point and the minimum melting point indicates that the resin is more uniformly dispersed.

Apparatus:

Atomic force microscope (AFM): "Dimension 3100" (available from Veeco Instruments)

Local thermal property measuring apparatus: "nano-TA" (available from Anasys Instruments)

Cantilever: "AN-2" (available from Anasys Instruments) Si nano-TA heating speed: 10° C./sec (6000 K/min)

EXAMPLES 1, 3 TO 7 AND 9 TO 10 AND COMPARATIVE EXAMPLE 1

Production of Crystalline Resins A, C to G, I, L and M

The raw monomers of the polycondensation-based resin component except for acrylic acid with the formulations as shown in Tables 1-1 and 1-2 (hereinafter collectively referred to merely as Table 1) were charged into a 10 L four-necked flask equipped with a nitrogen inlet tube, a dehydration tube, a stirrer and a thermocouple. The contents of the flask were heated to 160° C., and the raw monomers of the styrene-based resin component as shown in Table 1 and acrylic acid were added dropwise thereto through a dropping funnel over 1 h. The resulting reaction mixture was continuously stirred for 1 h while maintaining the mixture at a temperature of 160° C., and then held under a pressure of 8.3 kPa for 1 h to remove the remaining raw monomers of the styrene-based resin component therefrom. Thereafter, 40 g of tin 2-ethylhexanoate and 3 g of gallic acid were added to the reaction solution, and the obtained mixture was heat to 210° C. at which the mixture was reacted for 8 h. The reaction was further continued until reaching a desired melt viscosity (molecular weight), thereby obtaining crystalline resins A, C to G, I, L and M.

EXAMPLE 2

Production of Crystalline Resin B 1,6-Hexanediol, 1,4-butanediol and a half amount of terephthalic acid (corresponding to 40 mol) as the raw monomers of the polycondensation-based resin component with the formulations as shown in Table 1 as well as 20 g of tin 2-ethylhexanoate were charged into a 10 L four-necked flask equipped with a nitrogen inlet tube, a dehydration tube, a stirrer and a thermocouple. The contents of the flask were reacted with each other at 210° C. for 5 h. Thereafter, the obtained reaction mixture was cooled to 160° C., and the raw monomers of the styrene-based resin component as shown in Table 1 and acrylic acid were added dropwise thereto through a dropping funnel over 1 h. The resulting reaction mixture was continuously stirred for 1 h while maintaining the mixture at a temperature of 160° C., and then held under a pressure of 8.3 kPa for 1 h to remove the remaining raw monomers of the styrene-based resin component therefrom. Thereafter, the remaining half amount of terephthalic acid, 20 g of tin 2-ethylhexanoate and 2 g of gallic acid were added to the reaction solution, and the obtained mixture was heat to 210° C. at which the mixture was reacted for 6 h. The reaction was further continued under a pressure of 8 kPa until reaching a desired melt viscosity (molecular weight), thereby obtaining a crystalline resin B.

EXAMPLE 8

Production of Crystalline Resin H 1,6-Hexanediol, 1,4-butanediol and terephthalic acid as the raw monomers of the polycondensation-based resin component with the formulations as shown in Table 1 as well as 40 g of tin 2-ethylhexanoate were charged into a 10 L four-necked flask equipped with a nitrogen inlet tube, a dehydration tube, a stirrer and a thermocouple. The contents of the flask were reacted with each other at 210° C. for 7 h. Thereafter, the obtained reaction mixture was cooled to 160° C., and the raw monomers of the styrene-based resin component as shown in Table 1 and acrylic acid were added dropwise thereto through a dropping funnel over 1 h. The resulting reaction mixture was continuously stirred for 1 h while maintaining the mixture at a temperature of 160° C., and then held under a pressure of 8.3 kPa for 1 h to remove the remaining raw monomers of the styrene-based resin component therefrom. Thereafter, fumaric acid and 4 g of tert-butyl catechol were added to the reaction solution, and the obtained mixture was heat to 210° C. over 6 h. The reaction mixture was further reacted under a pressure of 8 kPa until reaching a desired melt viscosity (molecular weight), thereby obtaining a crystalline resin H.

COMPARATIVE EXAMPLE 2

Production of Crystalline Resin J

The raw monomers of the polycondensation-based resin component with the formulations as shown in Table 1 were charged into a 10 L four-necked flask equipped with a nitrogen inlet tube, a dehydration tube, a stirrer and a thermocouple. The contents of the flask were reacted with each other in the presence of 40 g of tin 2-ethylhexanoate and 2 g of gallic acid at 210° C. for 10 h. The resulting reaction mixture was further reacted under a pressure of 8 kPa until reaching a desired melt viscosity (molecular weight), thereby obtaining a crystalline resin J.

COMPARATIVE EXAMPLE 3

Production of Crystalline Resin K

The raw monomers of the polycondensation-based resin component except for fumaric acid with the formulations as shown in Table 1 were charged into a 10 L four-necked flask equipped with a nitrogen inlet tube, a dehydration tube, a stirrer and a thermocouple. The contents of the flask were reacted with each other in the presence of 40 g of tin 2-ethylhexanoate and 2 g of gallic acid at 210° C. for 7 h. The obtained reaction solution was cooled to 160° C., and fumaric acid was added thereto. The obtained reaction mixture was heated to 210° C. over 6 h, and further reacted under a pressure of 8 kPa until reaching a desired melt viscosity (molecular weight), thereby obtaining a crystalline resin K.

The formulated compositions of the raw monomers of the polycondensation-based resin component and the raw monomers of the styrene-based resin component for the respective crystalline resins A to M as well as various properties of the thus obtained crystalline resins are collectively shown in Table 1.

The crystalline resins obtained in Examples 1 to 8 respectively showed one glass transition temperature. This indicates that the styrene-based resin component and the polycondensation-based resin component were mutually well dispersed in the resins. On the other hand, the crystalline resins obtained in Examples 9 and 10 respectively showed two glass transition temperatures, i.e., a lower Tg value derived from the polycondensation-based resin component and a higher Tg value derived from the styrene-based resin component were measured. This indicates that the dispersion state of Examples 9 and 10 were poor as compared to those of Examples 1 to 8. In addition, the more uniform dispersion of the resins obtained in Examples 1 to 8 was recognized by the measurement by "nano-Thermal Analysis" indicating a small difference between maximum and minimum melting points thereof.

TABLE 1-1-1

|  | Examples | | | |
|---|---|---|---|---|
|  | 1 | 2 | 3 | 4 |
| Crystalline resin | A | B | C | D |
| Raw monomers | | | | |
| (Raw monomers of polycondensation-based resin component*[1]) | | | | |
| 1,6-Hexanediol | 70(2478 g) | 70(2478 g) | 70(2478 g) | 70(2478 g) |
| 1,4-Butanediol | 30(810 g) | 30(810 g) | 30(810 g) | 30(810 g) |
| Terephthalic acid | 80(3984 g) | 80(3984 g) | 80(3984 g) | 80(3984 g) |
| Sebacic acid | | | | |
| Fumaric acid | | | | |
| Acrylic acid (bireactive monomer) | 7(151 g) | 7(151 g) | 7(151 g) | 7(151 g) |
| (Raw monomers of styrene-based resin component*[2]) | | | | |
| Styrene | 100(1538 g) | 100(1538 g) | 100(1538 g) | 100(1538 g) |
| 2-Ethylhexyl acrylic acid | | | | |
| Dicumyl peroxide | 6(92 g) | 6(92 g) | 6(92 g) | 6(92 g) |
| Weight ratio*[A] | 83/17 | 83/17 | 83/17 | 83/17 |
| Amount of bireactive monomer*[B] (mol) | 14 | 14 | 14 | 14 |
| Properties | | | | |
| Softening point (° C.) | 110.5 | 111.1 | 108.1 | 106.2 |
| Glass transition temperature*[C] (° C.) | 100 | 100 | 100 | 100 |
| Glass transition temperature*[D] | 35 | 38 | 28 | 23 |
| Endothermic maximum peak temperature: melting point (° C.) | 109.2 | 108.6 | 109.3 | 109 |

TABLE 1-1-1-continued

|  | Examples | | | |
| --- | --- | --- | --- | --- |
|  | 1 | 2 | 3 | 4 |
| Softening point/endothermic maximum peak temperature | 1.01 | 1.02 | 0.99 | 0.97 |
| Storage elastic modulus at 160° C. (G') | 2300 | 3100 | 720 | 340 |
| Maximum melting point by nano-thermal analysis (° C.) | 91.1 | 93.4 | 90.9 | 91.3 |
| Minimum melting point by nano-thermal analysis (° C.) | 87.4 | 85.9 | 87.2 | 87.7 |
| Difference between maximum and minimum melting points by nano-thermal analysis (° C.) | 3.7 | 7.5 | 3.7 | 3.6 |
| Acid value (mgKOH/g) | 16.3 | 17.1 | 18.7 | 20.1 |

Note
[*1] The numeral values each indicate an amount of raw monomer added (molar ratio based on a total amount of alcohol monomers as 100); the numeral value within each parenthesis indicates grams.
[*2] The numeral values each indicate an amount of raw monomer added (% by weight); the numeral value in each parenthesis indicates grams; the value for dicumyl peroxide indicates % by weight based on a weight of vinyl-based resin monomers as 100.
[*A] Weight ratio (total amount of raw monomers of polycondensation-based resin component/total amount of raw monomers of styrene-based resin component)
[*B] [(Moles of bireactive monomer/total moles of raw monomers of styrene-based resin component) × 100] (mol)
[*C] Glass transition temperature of styrene-based resin component according to Fox formula (° C.)
[*D] Glass transition temperature of crystalline resin

TABLE 1-1-2

|  | Examples | | |
| --- | --- | --- | --- |
|  | 5 | 6 | 7 |
| Crystalline resin | E | F | G |
| Raw monomers (Raw monomers of polycondensation-based resin component[*1]) | | | |
| 1,6-Hexanediol | 100(3540 g) | 100(2950 g) | 70(2478 g) |
| 1,4-Butanediol |  |  | 30(810 g) |
| Terephthalic acid | 80(3984 g) | 65(2698 g) | 75(3735 g) |
| Sebacic acid |  |  |  |
| Fumaric acid |  |  |  |
| Acrylic acid (bireactive monomer) | 7(151 g) | 14(252 g) | 7(151 g) |
| (Raw monomers of styrene-based resin component[*2]) | | | |
| Styrene | 100(1538 g) | 100(3303 g) | 80(1194 g) |
| 2-Ethylhexyl acrylic acid |  |  | 20(298 g) |
| Dicumyl peroxide | 6(92 g) | 6(198 g) | 6(92 g) |
| Weight ratio[*A] | 83/17 | 64/36 | 83/17 |
| Amount of bireactive monomer[*B] (mol) | 14 | 11 | 16 |
| Properties | | | |
| Softening point (° C.) | 130.1 | 108.3 | 107.8 |
| Glass transition temperature[*C] (° C.) | 100 | 100 | 56 |
| Glass transition temperature[*D] | 34 | 51 | 14 |
| Endothermic maximum peak temperature: melting point (° C.) | 128.6 | 107.3 | 106.5 |
| Softening point/endothermic maximum peak temperature | 1.01 | 1.01 | 1.01 |
| Storage elastic modulus at 160° C. (G') | 3600 | 3800 | 3000 |
| Maximum melting point by nano-thermal analysis (° C.) | 108.7 | 90.2 | 92.6 |
| Minimum melting point by nano-thermal analysis (° C.) | 100.3 | 86.1 | 81.7 |

TABLE 1-1-2-continued

|  | Examples | | |
| --- | --- | --- | --- |
|  | 5 | 6 | 7 |
| Difference between maximum and minimum melting points by nano-thermal analysis (° C.) | 8.4 | 4.1 | 10.9 |
| Acid value (mgKOH/g) | 17.2 | 12.9 | 14.5 |

Note
[*1] The numeral values each indicate an amount of raw monomer added (molar ratio based on a total amount of alcohol monomers as 100); the numeral value within each parenthesis indicates grams.
[*2] The numeral values each indicate an amount of raw monomer added (% by weight); the numeral value in each parenthesis indicates grams; the value for dicumyl peroxide indicates % by weight based on a weight of vinyl-based resin monomers as 100.
[*A] Weight ratio (total amount of raw monomers of polycondensation-based resin component/total amount of raw monomers of styrene-based resin component)
[*B] [(Moles of bireactive monomer/total moles of raw monomers of styrene-based resin component) × 100] (mol)
[*C] Glass transition temperature of styrene-based resin component according to Fox formula (° C.)
[*D] Glass transition temperature of crystalline resin

TABLE 1-2-1

|  | Examples | | |
| --- | --- | --- | --- |
|  | 8 | 9 | 10 |
| Crystalline resin | H | L | M |
| Raw monomers (Raw monomers of polycondensation-based resin component[*1]) | | | |
| 1,6-Hexanediol | 100(3540 g) | 70(2478 g) | 70(2479 g) |
| 1,4-Butanediol |  | 30(810 g) | 30(811 g) |
| Terephthalic acid | 50(2490 g) | 81(4034 g) | 82(4084 g) |
| Sebacic acid |  |  |  |
| Fumaric acid | 40(1392 g) |  |  |

TABLE 1-2-1-continued

|  | Examples | | |
| --- | --- | --- | --- |
|  | 8 | 9 | 10 |
| Acrylic acid (bireactive monomer) (Raw monomers of styrene-based resin component*²) | 7(151 g) | 4(86 g) | 2(43 g) |
| Styrene | 100(1548 g) | 100(1538 g) | 100(1539 g) |
| 2-Ethylhexyl acrylic acid | | | |
| Dicumyl peroxide | 6(93 g) | 6(92 g) | 6(93 g) |
| Weight ratio*$^A$ | 83/17 | 83/17 | 83/17 |
| Amount of bireactive monomer*$^B$ (mol) | 14 | 6 | 4 |
| Properties | | | |
| Softening point (° C.) | 105.4 | 109.6 | 112.3 |
| Glass transition temperature*$^C$ (° C.) | 100 | 100 | 100 |
| Glass transition temperature*$^D$ | 10 | 22/57 | 16/67 |
| Endothermic maximum peak temperature: melting point (° C.) | 106.8 | 110.3 | 111.5 |
| Softening point/endothermic maximum peak temperature | 0.99 | 0.99 | 1.01 |
| Storage elastic modulus at 160° C. (G') | 2600 | 2600 | 2400 |
| Maximum melting point by nano-thermal analysis (° C.) | 91.4 | 95.7 | 100.2 |
| Minimum melting point by nano-thermal analysis (° C.) | 80.6 | 84.5 | 73.6 |
| Difference between maximum and minimum melting points by nano-thermal analysis (° C.) | 10.8 | 11.2 | 26.8 |
| Acid value (mgKOH/g) | 20.4 | 15.6 | 15.3 |

Note
*¹The numeral values each indicate an amount of raw monomer added (molar ratio based on a total amount of alcohol monomers as 100); the numeral value within each parenthesis indicates grams.
*²The numeral values each indicate an amount of raw monomer added (% by weight); the numeral value in each parenthesis indicates grams; the value for dicumyl peroxide indicates % by weight based on a weight of vinyl-based resin monomers as 100.
*$^A$Weight ratio (total amount of raw monomers of polycondensation-based resin component/total amount of raw monomers of styrene-based resin component)
*$^B$[(Moles of bireactive monomer/total moles of raw monomers of styrene-based resin component) × 100] (mol)
*$^C$Glass transition temperature of styrene-based resin component according to Fox formula (° C.)
*$^D$Glass transition temperature of crystalline resin

TABLE 1-2-2

|  | Comparative Examples | | |
| --- | --- | --- | --- |
|  | 1 | 2 | 3 |
| Crystalline resin | I | J | K |
| Raw monomers (Raw monomers of polycondensation-based resin component*¹) | | | |
| 1,6-Hexanediol | 100(2950 g) | 70(2891 g) | 100(4130 g) |
| 1,4-Butanediol | | 30(945 g) | |
| Terephthalic acid | | 90(5229 g) | 70(4067 g) |
| Sebacic acid | 85(4299 g) | | |
| Fumaric acid | | | 30(1218 g) |
| Acrylic acid (bireactive monomer) (Raw monomers of styrene-based resin component*²) | 7(126 g) | | |
| Styrene | 100(1552 g) | | |
| 2-Ethylhexyl acrylic acid | | | |
| Dicumyl peroxide | 6(93 g) | | |
| Weight ratio*$^A$ | 83/17 | | |
| Amount of bireactive monomer*$^B$ (mol) | 12 | | |
| Properties | | | |
| Softening point (° C.) | 98.5 | 106.5 | 113.6 |
| Glass transition temperature*$^C$ (° C.) | 100 | | |
| Glass transition temperature*$^D$ | 7 | 13 | 2 |
| Endothermic maximum peak temperature: melting point (° C.) | 94.6 | 110.4 | 111.4 |
| Softening point/endothermic maximum peak temperature | 1.04 | 0.96 | 1.01 |
| Storage elastic modulus at 160° C. (G') | 3100 | 110 | 3500 |
| Maximum melting point by nano-thermal analysis (° C.) | 88.3 | 92.4 | 113.1 |
| Minimum melting point by nano-thermal analysis (° C.) | 75.2 | 58.7 | 64.6 |
| Difference between maximum and minimum melting points by nano-thermal analysis (° C.) | 13.1 | 33.7 | 48.5 |
| Acid value (mgKOH/g) | 18.3 | 22.6 | 14.3 |

Note
*¹The numeral values each indicate an amount of raw monomer added (molar ratio based on a total amount of alcohol monomers as 100); the numeral value within each parenthesis indicates grams.
*²The numeral values each indicate an amount of raw monomer added (% by weight); the numeral value in each parenthesis indicates grams; the value for dicumyl peroxide indicates % by weight based on a weight of vinyl-based resin monomers as 100.
*$^A$Weight ratio (total amount of raw monomers of polycondensation-based resin component/total amount of raw monomers of styrene-based resin component)
*$^B$[(Moles of bireactive monomer/total moles of raw monomers of styrene-based resin component) × 100] (mol)
*$^C$Glass transition temperature of styrene-based resin component according to Fox formula (° C.)
*$^D$Glass transition temperature of crystalline resin

PRODUCTION EXAMPLE 1

Production of Non-Crystalline Resin AA

A 10 L four-necked flask equipped with a nitrogen inlet tube, a dehydration tube, a stirrer and a thermocouple was charged with the raw monomers of the polycondensation-based resin except for trimellitic anhydride with the formulation as shown in Table 2. The contents of the flask were heated from 180° C. to 210° C. over 8 h to react with each other in the presence of 2 g of tert-butyl catechol. Then, the obtained reaction solution was further mixed with trimellitic anhydride and reacted at 200° C. for 2 h. The resulting reaction mixture was further reacted under a pressure of 8 kPa until reaching a desired softening point, thereby obtaining a non-crystalline resin AA.

PRODUCTION EXAMPLE 2

Production of Non-Crystalline Resin AB

A 10 L four-necked flask equipped with a nitrogen inlet tube, a dehydration tube, a stirrer and a thermocouple was charged with the raw monomers of the polycondensation-based resin except for trimellitic anhydride with the formulation as shown in Table 2. The contents of the flask were reacted with each other in the presence of 40 g of tin 2-ethylhexanoate and 2 g of gallic acid at 235° C. over 8 h. Then, the obtained reaction solution was further mixed with trimellitic anhydride and reacted at 210° C. for 1 h. The resulting reaction mixture was further reacted under a pressure of 8 kPa until reaching a desired softening point, thereby obtaining a non-crystalline resin AB.

The formulated compositions of the raw monomers of the thus obtained non-crystalline resins AA and AB as well as the measurement results of softening point, acid value and glass transition temperature of the respective resins are collectively shown in Table 2.

TABLE 2

|  | Production Example 1 Non-crystalline resin AA | | Production Example 2 Non-crystalline resin AB | |
|---|---|---|---|---|
| Raw monomers | g | mol %*3 | g | mol %*3 |
| (Alcohol component) | | | | |
| BPA-PO*1 | 4900 | 70 | 3150 | 50 |
| BPA-EO*2 | 1950 | 30 | 2925 | 50 |
| (Acid component) | | | | |
| Terephthalic acid | | | 2092 | 70 |
| Dodecenyl succinic anhydride | | | 482 | 10 |
| Fumaric acid | 1392 | 60 | | |
| Trimellitic anhydride | 768 | 20 | 518 | 15 |
| Properties | | | | |
| Softening point (° C.) | | 128.5 | | 98.6 |
| Acid value (mgKOH/g) | | 17.4 | | 22.3 |
| Glass transition temperature (° C.) | | 62.3 | | 58.3 |

Note
*1BPA-PO: Polyoxypropylene (2.2) adduct of bisphenol A
*2BPA-EO: Polyoxyethylene (2.0) adduct of bisphenol A
*3mol %: Molar ratio based on total amount (moles) of alcohol components as 100.

PRODUCTION EXAMPLES 3 AND 4

Production of Non-Crystalline Resins BA and BB

BPA-PO, BPA-EO, terephthalic acid and adipic acid with the formulations as shown in Table 3 as well as 40 g of tin 2-ethylhexanoate were charged into a 10 L four-necked flask equipped with a nitrogen inlet tube, a dehydration tube, a stirrer and a thermocouple. The contents of the flask were reacted with each other at 230° C. until particles of the terephthalic acid monomer were no longer recognized. After completion of the reaction, the obtained reaction solution was further reacted under a pressure of 8.3 kPa for 1 h.

Then, the obtained reaction mixture was cooled to 160° C., and styrene, 2-ethylhexylacrylic acid, acrylic cid and dicumyl peroxide were added dropwise thereto through a dropping funnel over 1 h. The resulting reaction mixture was continuously stirred for 1 h while maintaining the mixture at a temperature of 160° C., heated to 210° C., and then held under a pressure of 8.3 kPa for 1 h to remove the remaining raw monomers of the styrene-based resin component therefrom. The obtained reaction mixture was further mixed with trimellitic anhydride and reacted until reaching a desired softening point, thereby obtaining non-crystalline resins BA and BB, respectively.

The formulated compositions of the raw monomers of the thus obtained non-crystalline resins BA and BB as well as the measurement results of softening point, acid value and glass transition temperature of the respective resins are collectively shown in Table 3.

TABLE 3

|  | Production Example 3 Non-crystalline resin Resin BA | | Production Example 4 Non-crystalline resin Resin BB | |
|---|---|---|---|---|
| Raw monomers | g | mol %*3 | g | mol %*3 |
| (Raw monomers of polycondensation-based resin component) | | | | |
| BPA-PO*1 | 3675 | 70 | 3675 | 70 |
| BPA-EO*2 | 1463 | 30 | 1463 | 30 |
| Terephthalic acid | 1494 | 60 | 1868 | 75 |
| Adipic acid | 219 | 10 | | |
| Trimellitic anhydride | 576 | 20 | 288 | 10 |
| Acrylic acid (bireactive monomer) | 86 | 8 | 86 | 8 |
| (Raw monomers of vinyl-based resin component) | | | | |
| Styrene | 1322 | 80 | 1302 | 80 |
| 2-Ethylhexyl acrylic acid | 330 | 20 | 325 | 20 |
| Dicumyl peroxide | 99 | 6 | 98 | 6 |
| Properties | | | | |
| Softening point (° C.) | | 130.7 | | 99.2 |
| Acid value (mgKOH/g) | | 24.6 | | 20.3 |
| Glass transition temperature (° C.) | | 62.5 | | 58.7 |

Note
*1BPA-PO: Polyoxypropylene (2.2) adduct of bisphenol A
*2BPA-EO: Polyoxyethylene (2.0) adduct of bisphenol A
*3mol %: The amount of the polycondensation-based resin monomers is a molar ratio based on a total amount (moles) of alcohol components as 100; the value for dicumyl peroxide indicates mol % based on an amount (mol) of monomers of vinyl-based resin as 100.

EXAMPLE 11

Production of Toner 1

One hundred parts by weight of a mixed resin prepared by mixing the crystalline resin and the non-crystalline resin at proportions as shown in Table 4, 5 parts by weight of a pigment "ECB-301", 1 part by weight of a charge controlling agent "LR-147", 1 part by weight of "NJ STAR NU-100" and 2 parts by weight of "Carnauba Wax C1" were charged into a Henschel mixer and intimately mixed with each other therein, and then melt-kneaded using a co-rotating type twin-screw extruder having a whole length of 1560 mm, a screw diameter of 42 mm and a barrel inner diameter of 43 mm. The melt-kneading conditions were controlled such that a roll rotating speed was 200 r/min; a heating temperature within rolls was 120° C.; a feed speed of the mixture was 10 kg/h; and an average residence time was about 18 s. The resulting kneaded material was rolled and cooled using a cooling roller, and then pulverized using a jet-mill, thereby obtaining particles having a volume median particle size ($D_{50}$) of 5.5 μm.

To 100 parts by weight of the resulting toner mother particles were added 1.0 part by weight of an external additive "Aerogel R-972" (hydrophobic silica; available from Nippon Aerogel Co., Ltd.) and 1.0 part by weight of an external additive "SI-Y" (hydrophobic silica; available from Nippon Aerogel Co., Ltd.), and the obtained mixture was mixed for 5 min using a Henschel mixer to treat the toner mother particles with these external additives, thereby obtaining a toner 1 in the form of toner particles (having a volume median particle size ($D_{50}$) of 5.5 μm).

EXAMPLES 12 TO 26 AND COMPARATIVE
EXAMPLES 4 TO 8

Production of Toners 2 to 21

The same procedure as in Example 11 was repeated except that the formulated compositions of the toner were changed as described below, and the crystalline resins and the non-crystalline resins as shown in Tables 4 and 5 were used, thereby obtaining respective toners 2 to 21.
(Formulations of Toners)

| Resin/ECB-301/LR-147/NU-100/carnauba wax=100/ 5/1/1/2(parts by weight) | Formulation A |
|---|---|
| Resin/ECB-301/LR-147/carnauba wax=100/5/1/2 (parts by weight) | Formulation B |
| Resin/ECB-301/E-84/H105=100/5/1/2(parts by weight) | Formulation C |
| Resin/Regal 330/T-77/HNP-9=100/5/1/2(parts by weight) | Formulation D |

The details of the respective additives are as follows.
ECB-301: C.I. Pigment Blue 15:3; available from Dainichiseika Color & Chemicals Mtg Co., Ltd.
LR-147: available from Japan Carlit Co., Ltd.
NU-100: "NJ STAR NU-100" available from New Japan Chemicals Co., Ltd.
Carnauba Wax C1: available from Kato Yoko Co., Ltd.; melting point: 83° C.
E-84: "BONTRON E84" available from Clariant Co., Ltd.
H105: "PARAFURINTO H105"; available from Sasol Wax Co., Ltd.; melting point: 110° C.
Regal 330: available from Cabot Corp.
T-77: available from Hodogaya Chemical Co., Ltd.
HNP-9: paraffin wax; available from Nippon Seiroh Co., Ltd.; melting point: 80° C.
The resulting toners 1 to 21 were respectively measured and evaluated for a volume median particle size ($D_{50}$), fixing ability, gloss and anti-filming property by the following methods. The results are shown in Tables 4 and 5.
[Measurement and Evaluation for Performance of Toner]
(Volume-Median Particle Size ($D_{50}$) of Toner)
(1) Preparation of Dispersion
Ten milligrams of a sample to be measured were added to 5 mL of a dispersing solution [a 5% by weight aqueous solution of "EMULGEN 109P" (available from Kao Corp.; polyoxyethylene lauryl ether, HLB: 13.6)], and dispersed using an ultrasonic disperser for 1 min. Thereafter, 25 mL of an electrolyte "Isotone II" (available from Beckman Coulter, Inc.) were added to the obtained mixture, and the resulting mixture was further dispersed using the ultrasonic disperser for 1 min to obtain a dispersion.
(2) Measuring Apparatus: "Coulter Multisizer II" (available from Beckman Coulter Inc.)
(3) Aperture Diameter: 50 μm;
(4) Analyzing Software: "Coulter Multisizer AccuComp Ver. 1.19" (available from Beckman Coulter Inc.)
(5) Measuring Conditions
One-hundred milliliters of the electrolyte and the dispersion were charged into a beaker, and particle sizes of 30000 particles in the dispersion were measured at such a concentration of the dispersion at which the measurement for the 30000 particles were completed within 20 s, to determine a volume median particle diameter ($D_{50}$) thereof.

(Low-Temperature Fixing Ability)
The toner was loaded into a copying machine "AR-505" available from Sharp Corp., to obtain an unfixed image (printed area: 2 cm×12 cm; amount of the toner adhered: 0.5 mg/cm$^2$). With a fixing device of the copying machine being off-line, the image was fixed on a recording paper at a rate of 400 mm/sec while increasing the fixing temperature from 90° C. to 240° C. at intervals of 5° C. Meanwhile, "Copy Bond SF-70NA" (available from Sharp Corp.; 75 g/m$^2$) was used as the fixing paper.
An adhesive cellophane tape "UNICEF CELLOPHANE" (available from Mitsubishi Pencil Co., Ltd.; width: 18 mm; JIS Z-1522) was attached onto the fixed image, and passed through a fixing roll set to 30° C. Then, the tape was peeled off from the fixed image to measure an optical reflection density thereof before and after peeling off the tape, using a reflection-type densitometer "RD-915" available from Gretag Macbeth Corp. From the thus measured values, a minimum fixing temperature of the toner was determined as the temperature of the fixing roll at which a ratio in optical reflection density of the fixed image between before and after peeling off the tape (after peeling/before peeling) first exceeded 90%. The minimum fixing temperature was examined to evaluate a low-temperature fixing ability of the toner according to the following evaluation criteria.
5: Minimum fixing temperature was lower than 125° C.;
3: Minimum fixing temperature was not lower than 125° C. but lower than 145° C.;
1: Minimum fixing temperature was not lower than 145° C.
(Gloss)
Method for Evaluation of Image
The toner was loaded into a copying machine "AR-505" available from Sharp Corp., to obtain an unfixed image (printed area: 2 cm×12 cm; amount of the toner adhered: 0.5 mg/cm$^2$). J paper (available from Fuji Xerox Corp.) was used as a printing medium. With a fixing device of the copying machine being off-line, the image was fixed on the paper at a temperature of 160° C. and a rate of 400 mm/sec.
Gloss of Printed Image
The printed image was placed on a cardboard and was irradiated with light at an angle of 60° to measure a gloss thereof using a gloss meter "IG-330" available from Horiba Ltd. The higher value indicates a higher gloss.
(Anti-Filming Property)
The toner was loaded in a non-magnetic one component-type developing device "MicroLine 9300PS" available from Oki Data Corporation. After images having a printing percentage of 5% were printed on 20 sheets under environmental conditions of 30° C. and 90% RH, the optical reflection density of the images on the 20th sheet were measured using a reflection-type densitometer "RD-915" available from Gretag Macbeth Corp.
In addition, the images were printed on 1000 sheets, and the optical reflection density of the images on the 1000th sheet was measured again using a reflection-type densitometer "RD-915" available from Gretag Macbeth Corp. The difference between the image densities on both the sheets was calculated to evaluate a durability of the images according to the following evaluation criteria.
5: Difference between image densities was less than 0.1.
4: Difference between image densities was not less than 0.1 but less than 0.2.
3: Difference between image densities was not less than 0.2 but less than 0.3.
2: Difference between image densities was not less than 0.3 but less than 0.5.
4: Difference between image densities was not less than 0.5.

TABLE 4

| | Examples | | | | | |
|---|---|---|---|---|---|---|
| | 11 | 12 | 13 | 14 | 15 | 16 |
| Toner | 1 | 2 | 3 | 4 | 5 | 6 |
| Proportion of resins (weight ratio) | AA/AB/A = 30/50/20 | AA/AB/A = 30/50/20 | AA/AB/A = 30/50/20 | AA/AB/A = 30/50/20 | AA/AB/B = 30/50/20 | AA/AB/C = 30/50/20 |
| Crystalline resin/non-crystalline resin (weight ratio) | 20/80 | 20/80 | 20/80 | 20/80 | 20/80 | 20/80 |
| Formulated composition of toner | A | B | C | D | A | A |
| Toner particle size $D_{50}$ (μm) | 5.5 | 5.6 | 5.6 | 5.5 | 5.6 | 5.5 |
| Toner performance | | | | | | |
| Low-temperature fixing ability | 5 | 5 | 5 | 5 | 5 | 5 |
| Gloss | 27 | 25 | 24 | 26 | 21 | 28 |
| Anti-filming property | 5 | 4 | 4 | 4 | 4 | 4 |

| | Examples | | | | |
|---|---|---|---|---|---|
| | 17 | 18 | 19 | 20 | 21 |
| Toner | 7 | 8 | 9 | 10 | 11 |
| Proportion of resins (weight ratio) | AA/AB/D = 30/50/20 | AA/AB/E = 30/50/20 | AA/AB/F = 30/50/20 | AA/AB/G = 30/50/20 | AA/AB/H = 30/50/20 |
| Crystalline resin/non-crystalline resin (weight ratio) | 20/80 | 20/80 | 20/80 | 20/80 | 20/80 |
| Formulated composition of toner | A | A | A | A | A |
| Toner particle size $D_{50}$ (μm) | 5.7 | 5.3 | 5.5 | 5.5 | 5.6 |
| Toner performance | | | | | |
| Low-temperature fixing ability | 5 | 3 | 3 | 5 | 5 |
| Gloss | 28 | 24 | 28 | 23 | 23 |
| Anti-filming property | 3 | 5 | 5 | 3 | 3 |

TABLE 5

| | Examples | | | | |
|---|---|---|---|---|---|
| | 22 | 23 | 24 | 25 | 26 |
| Toner | 12 | 13 | 14 | 15 | 16 |
| Proportion of resins (weight ratio) | AA/AB/A = 30/40/30 | AA/AB/A = 30/60/10 | BA/BB/A = 30/50/20 | AA/AB/L = 30/50/20 | AA/AB/M = 30/50/20 |
| Crystalline resin/non-crystalline resin (weight ratio) | 30/70 | 10/90 | 20/80 | 20/80 | 20/80 |
| Formulated composition of toner | A | A | A | A | A |
| Toner particle size $D_{50}$ (μm) | 5.6 | 5.5 | 5.4 | 5.5 | 5.4 |

TABLE 5-continued

| Toner performance | | | | | |
|---|---|---|---|---|---|
| Low-temperature fixing ability | 5 | 3 | 5 | 3 | 3 |
| Gloss | 19 | 24 | 24 | 20 | 16 |
| Anti-filming property | 5 | 5 | 5 | 4 | 3 |

| | Comparative Examples | | | | |
|---|---|---|---|---|---|
| | 4 | 5 | 6 | 7 | 8 |
| Toner | 17 | 18 | 19 | 20 | 21 |
| Proportion of resins (weight ratio) | AA/AB/J = 30/50/20 | AA/AB/K = 30/50/20 | AA/AB = 30/70 | BA/BB/J = 30/50/20 | AA/AB/I = 30/50/20 |
| Crystalline resin/non-crystalline resin (weight ratio) | 20/80 | 20/80 | — | 20/80 | 20/80 |
| Formulated composition of toner | A | A | A | A | A |
| Toner particle size $D_{50}$ (μm) | 5.7 | 5.6 | 5.5 | 5.6 | 5.5 |
| Toner performance | | | | | |
| Low-temperature fixing ability | 5 | 3 | 1 | 5 | 5 |
| Gloss | 15 | 7 | 22 | 12 | 16 |
| Anti-filming property | 1 | 2 | 4 | 1 | 1 |

From Tables 4 and 5, it was confirmed that the toner of the present invention not only exhibits a satisfactory fixing ability but also is excellent in gloss and anti-filming property of the resulting images.

In addition, it was confirmed from the measurement by the nano-Thermal Analysis that the crystalline resin was finely dispersed in the resin binder of the present invention.

The invention claimed is:

1. A crystalline resin for toners, comprising a composite resin comprising:
   a polycondensation resin component obtained by polycondensing an alcohol component comprising an aliphatic diol having 2 to 10 carbon atoms with a carboxylic acid component comprising an aromatic dicarboxylic acid, and
   a styrene-based resin component, wherein
   the alcohol component comprises the aliphatic diol having 2 to 10 carbon atoms in an amount of 70 to 100% mol %,
   the carboxylic acid component comprises the aromatic dicarboxylic acid in an amount of from 70 to 100 mol %,
   the crystalline resin has a value of from 0.6 to 1.4 for softening point/endothermic maximum peak temperature, and
   the composite resin is a resin obtained by polymerizing (a) monomers of the polycondensation resin component which comprise the alcohol component and the carboxylic acid component, (b) monomers of the styrene-based resin component and (c) a bireactive monomer capable of reacting with the monomers of the polycondensation resin component and the monomers of the styrene-based resin component.

2. The crystalline resin for toners according to claim 1, wherein the bireactive monomer is present in an amount of from 2 to 25 mol on the basis of 100 mol of a total amount of the monomers of the styrene-based resin component.

3. The crystalline resin for toners according to claim 1, wherein a weight ratio of the polycondensation resin component to the styrene-based resin component (total amount of the monomers of the polycondensation-based resin component/total amount of the monomers of the styrene-based resin component) is from 50/50 to 95/5.

4. The crystalline resin for toners according to claim 1 and a non-crystalline resin.

5. A toner for electrophotography comprising the resin binder as defined in claim 4.

6. The crystalline resin for toners according to claim 1, wherein the carboxylic acid component comprises the aromatic dicarboxylic acid in an amount of 90 to 100 mol %.

7. The crystalline resin for toners according to claim 1, wherein the alcohol component comprises the aliphatic diol in an amount of 90 to 100 mol %.

8. The crystalline resin for toners according to claim 1, wherein the aliphatic diol comprises at least one compound selected from the group consisting of 1,4-butanediol and 1,6-hexanediol.

9. The crystalline resin for toners according to claim 1, wherein aromatic dicarboxylic acid compound comprises a compound selected from the group consisting of phthalic acid, isophthalic acid, and terephthalic acid, acid anhydrides thereof, and C1-C3 alkyl esters thereof.

10. The crystalline resin for toners according to claim 3, wherein the weight ratio is 60/40 to 90/10.

11. The crystalline resin for toners according to claim 3, wherein the weight ratio is 65/35 to 90/10.

12. The crystalline resin for toners according to claim 3, wherein the weight ratio is 70/30 to 88/12.

13. The crystalline resin for toners according to claim 1, wherein the alcohol component comprises at least one of 1,4-butanediol and 1,6-hexanediol, and the carboxylic acid component comprises terephthalic acid.

\* \* \* \* \*